Dec. 22, 1970  H. LEIBER  3,549,211
ANTI-LOCKING CONTROL SYSTEM FOR PRESSURE-ACTUATED
VEHICLE BRAKES
Filed June 3, 1969  2 Sheets-Sheet 1

INVENTOR.
Heinz Leiber
BY
Spencer & Kaye
ATTORNEYS

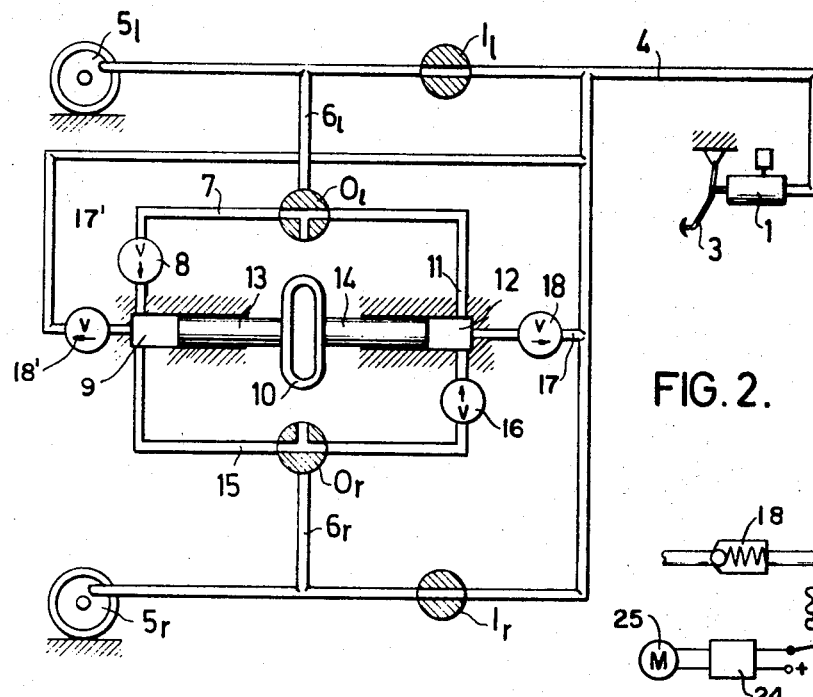
FIG. 2.
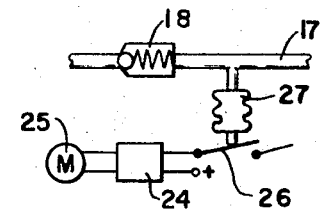
FIG. 1a.
FIG. 3a.
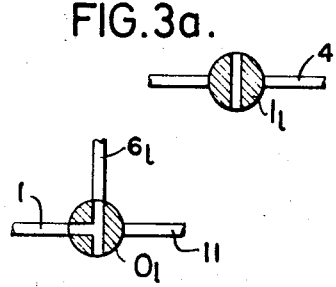
FIG. 4a.
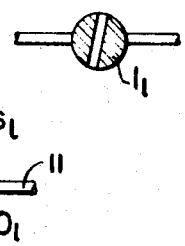
FIG. 3b.
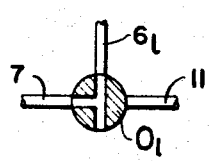
FIG. 4b.
FIG. 3c.
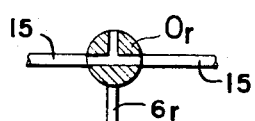
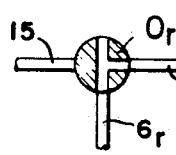
FIG. 4c.
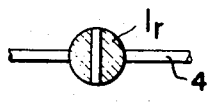
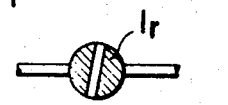
FIG. 3d.
FIG. 4d.
INVENTOR.
Heinz Leiber
BY *Spencer & Kaye*
ATTORNEYS

United States Patent Office 3,549,211
Patented Dec. 22, 1970

3,549,211
ANTI-LOCKING CONTROL SYSTEM FOR PRESSURE-ACTUATED VEHICLE BRAKES
Heinz Leiber, Leimen, Germany, assignor to Teldix GmbH, Heidelberg, Germany
Filed June 3, 1969, Ser. No. 829,861
Int. Cl. B60t 8/06
U.S. Cl. 303—21  7 Claims

ABSTRACT OF THE DISCLOSURE

The fluid return line of an anti-locking control system for vehicle brakes incorporates a double acting pump associated with the outlet valve for the brake system to return fluid to the master cylinder. In one position of the outlet valve, the pump merely circulates fluid in a closed path which offers resistance to fluid flow, whereas when the outlet valve is in another position the closed path is blocked and the pump then circulates fluid from the wheel cylinder circuit back to the master cylinder. The pump operates only during periods of brake actuation and may be controlled either in conjunction with brake light operation or in association with the mechanism which operates to close the normally open inlet valve between the master cylinder and the wheel cylinder.

BACKGROUND OF THE INVENTION

In anti-locking control systems for fluid pressure-actuated vehicle brakes of the type employing a normally open inlet valve between the master cylinder and the wheel cylinder and a normally closed outlet valve for reducing the pressure at the wheel cylinder during such periods of the control cycle in which the wheel-associated acceleration and deceleration sensor causes closing of the inlet valve and opening of the outlet valve, the brake fluid supply at the master cylinder may be diminished gradually. Moreover, as the inlet valve is repeatedly opened and closed and the outlet valve correspondingly closed and opened, the amount of brake fluid in the main pressure line is depleted so that the brake pedal "sinks." To overcome this problem, it has been proposed to provide a reservoir for receiving the fluid bled from the system through the outlet valve and to provide a pump for returning fluid from the reservoir to the main brake line. The pump may be operated in conjunction with a switching state of one of the valves, it may be operated in response to some predetermined level of fluid in the reservoir, or it may be operated in conjunction with the brake light circuit.

Alternatively, the reservoir may be eliminated and a pump provided directly between the outlet valve and the main pressure line. In such case, the pump may be operated in conjunction with the brake light circuit or in association with a switching state of one of the valves.

Ideally, the system using a reservoir with fluid level control of the pump would always provide brake fluid at the inlet of the pump when the latter is operated and the pump would not run dry unless some malfunction occurred in the system. In all other systems proposed above, normal operation may produce a situation in which the pump is operated at such time or for sufficiently long a time as completely to deplete the available supply of brake fluid at the pump inlet, i.e. the pump runs dry.

Since air may be introduced into the system whenever the pump runs dry, previous proposals are characterized by this possibility. As is well known, the presence of air within the brake system results in a "spongy" pedal and if present in sufficient amount may require "pumping" of the brake pedal in order to operate the brakes.

Additionally in the above systems it is possible that the pump may be disconnected while it is operating under full load and therefore may create problems arising from the correspondingly high disconnect current.

SUMMARY OF THE INVENTION

The present invention is directed to a system as described generally above in which a pump is provided with a closed flow path when the outlet valve is closed so that brake fluid may be circulated therein idly, with little resistance to flow and without the danger of running dry. When the outlet valve is opened, a second flow path is established from the wheel cylinder circuit, through the pump and to the main pressure line. Thus, the pump returns fluid to the main pressure line only when the outlet valve is opened. In neither flow path condition can the pump run dry.

The present invention involves a double acting pump and a conduit system providing a closed fluid flow path communicating with the pump chambers and within which conduit system check valves are positioned to allow unidirectional fluid flow when the pump is operating. A portion of the closed path is established through a part of the outlet valve which is open when the outlet valve connection to the wheel cylinder is closed and vice versa. When the outlet valve is opened and the closed path thereby blocked, the second fluid flow path is established allowing the unidirectional flow of fluid from the wheel cylinder circuit to the main pressure line.

The pump may be controlled incidental to the switching state of one of the control system valves, or it may be operated whenever the vehicle brake light is energized. The pump and its conduit system are so arranged that the pump will be switched off only when it is operating under negligible load so that the switching device for the pump may be of simple, economical and substantially trouble-free construction.

BRIEF DESCRIPTION OF THE DRAWINGS

FIG. 1a is a partial diagram illustrating actuation of the pump motor through the stop light circuit.

FIG. 2 is a schematic representation of the hydraulic circuitry for a pair of vehicle wheels.

FIGS. 3a–3d and 4a–4d are diagrammatic illustrations showing positions of the inlet and outlet valves possible with the configuration as shown in FIG. 2.

DETAILED DESCRIPTION OF THE INVENTION

Figure 1:
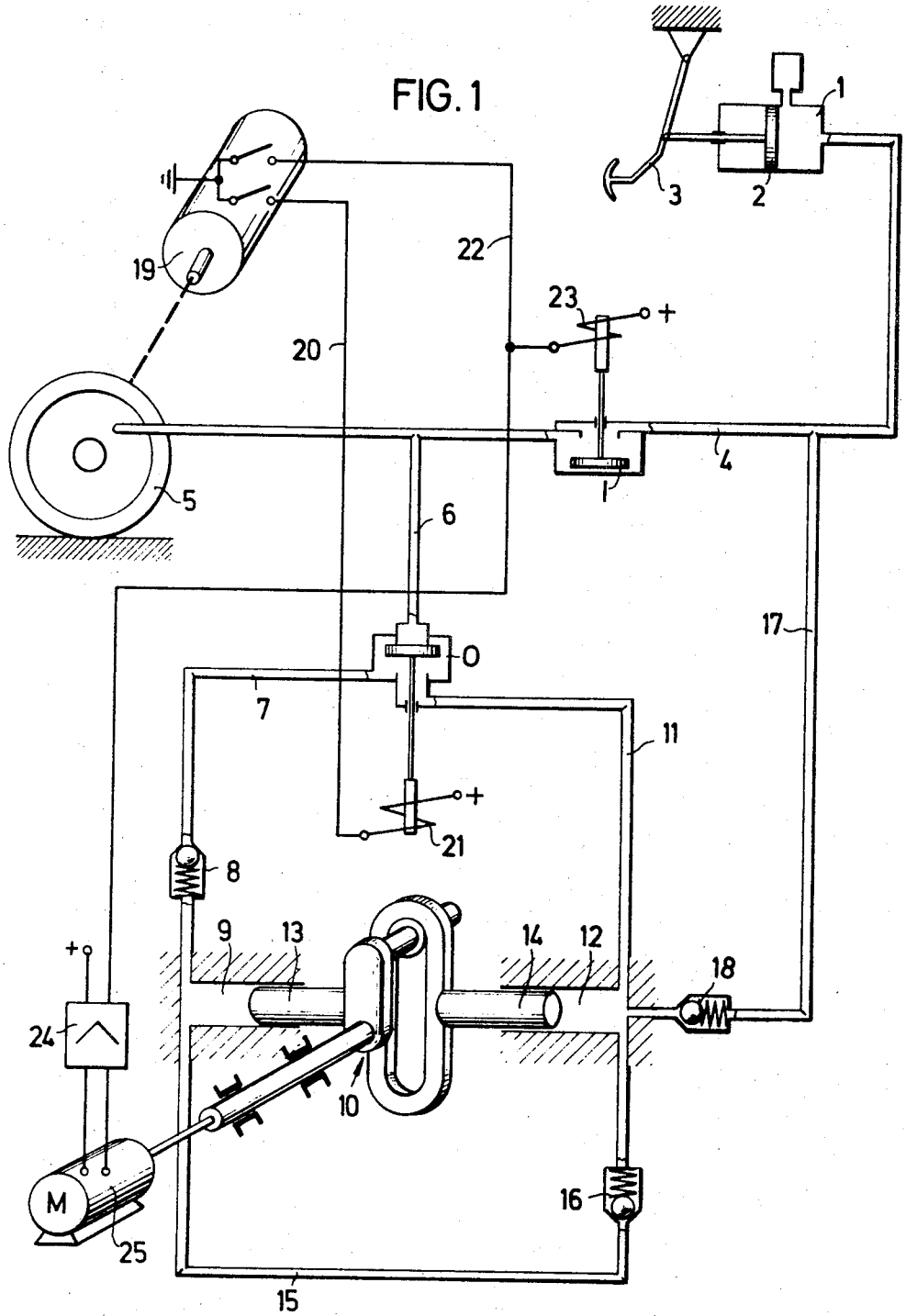
FIG. 1 is a schematic representation of the hydraulic and electrical circuits associated with a pump and conduit system according to the present invention.

Referring to FIG. 1, the system as shown therein incorporates a vehicle master cylinder 1 within which the operating piston 2 is disposed adapted to be actuated through the medium of the conventional brake pedal 3. When operated, the master cylinder 1 establishes pressure in the main pressure line 4 through the normally open inlet valve I to operate the brake on the vehicle wheel 5 through the medium of the associated wheel cylinder. The details of the anti-locking control system for the vehicle brakes forms per se no part of the present invention and the electrical circuitry therefor is shown in somewhat simplified and schematic form in FIG. 1.

The anti-locking system includes, in addition to the aforementioned normally open inlet valve I, the normally closed valve O connected, as shown at 6, to the wheel cylinder circuit and the two valves I and O are respectively provided with actuators 23 and 21 adapted to actuate these valves from the normal positions under the control of a sensor 19 connected to the vehicle wheel 5 and which senses vehicle wheel rotational accelerations and decelerations. The sensor 19 includes switch mechanism as shown which may be sequentially operated first to apply a signal at the conductor 22 and thus actuate the valve I to closed condition and then to produce a signal at the conductor 20 to actuate the valve O to a position in which the wheel cylinder line 6 is connected to the conduit 7 as will be explained more fully hereinafter.

The signal at the conductor 22 which actuates the valve I may also be applied to an amplifier 24 for operating the motor 25 which drives the pump mechanism indicated generally by the reference character 10. Thus, in the embodiment shown in FIG. 1, as soon as the inlet valve I is disposed to closed position from its normally open position, the pump mechanism 10 operates.

The pump 10 as symbolically shown is of double acting type including the two pistons 13 and 14 operating in respective cylinders 9 and 12. When the outlet valve O is in its normally closed condition, the two conduits 7 and 11 together with the conduit 15 form a closed fluid flow path to which the respective cylinder chambers of the pump 10 are connected as shown. Thus, with the outlet valve O in the position shown in FIG. 1, the pump operates to circulate fluid idly and with very little resistance within the closed path as aforementioned. The closed path conduit system includes the respective check valves 8 and 16 so that the fluid flow therewithin is unidirectional. With the pistons 13 and 14 operating to the right in FIG. 1, fluid will be drawn past the check valve 8 and into the cylinder chamber 9 whereas simultaneously fluid is expelled from the cylinder 12 to flow through the conduit 11 and into the conduit 7. When the pistons 13 and 14 are operating to the left in FIG. 1, fluid will be drawn into the cylinder chamber 12 past the check valve 16 while fluid is simultaneously expelled from the cylinder chamber 9 into the conduit 15 and it will thus be appreciated that as the pump operates the system in condition shown in FIG. 1, negligible load is imposed upon the pump motor 25.

When, however, the outlet valve O is disposed from its normally closed position as shown in FIG. 1 into a position in which the wheel cylinder circuit 6 is connected to the conduit 7 and the conduits 7 and 11 are blocked, operation of the pistons 13 and 14 to the right in FIG. 1 will withdraw fluid through the conduits 6 and 7 and past the check valve 8 into the cylinder chamber 9 and then when the pistons are operated to the left, the withdrawn fluid will be transferred from the cylinder chamber 9 through the conduit 15 and past the check valve 16 to the cylinder chamber 12. Since the conduit 11 is blocked in the opened *b* position of the outlet valve O, and since the check valve 16 prevents reverse flow of the fluid, operation of the pistons 13 and 14 to the right will cause fluid to be expelled from the cylinder chamber 12 and through the check valve 18 into the main pressure line 4 through the conduit 17 and the pump is thus operated under full load conditions as the pistons 13 and 14 are moved to the right in FIG. 1 with the outlet valve O in its opened position. It will also be appreciated that the closed fluid unidirectional flow path established when the outlet valve is in the normally closed position is effectively isolated from the main pressure line 4 by virtue of the fact that the check valve 18 remains firmly seated due to the pressure in the main line 4 and the connecting conduit 17.

In an alternate embodiment of the invention, as is shown in FIG. 1a, a pressure responsive actuator 27 is connected to the conduit 17 so as to close the switch contact 26 whenever the master cylinder is operated to produce pressure in the main line 4. The switch contact 26 forms part of the brake or stop light circuit and, as shown, is connected to the amplifier 24 to operate the pump motor 25 whenever the brake light is energized.

In any event, it will be appreciated that the pump is operable either in the idling condition during brake application at which time substantially no load is imposed thereon or in condition in which it directly pumps fluid from the wheel cylinder circuit to the main pressure line 4 at which time the pump is under full load. Since the outlet valve O will be in its normally closed condition or, if open, will be immediately returned to its normally closed condition whenever braking application is terminated, the pump motor 25 is never disconnected under full load conditions and the switching circuitry therefor and most particularly the switching device may be of simple, economical, and relatively trouble free construction. Furthermore, there is no condition of the pump and its associated conduit circuitry in which the pump may run dry and thus draw air into the brake system.

In the embodiment shown in FIG. 2, left and right vehicle wheels $5_l$ and $5_r$ are shown and portions of the hydraulic circuitry previously described and associated with the respective left and right wheels are designated in FIG. 2 with the appropriate left and right subscripts. In FIG. 2, the two inlet valves are shown symbolically in normally open position whereas the two outlet valves are shown symbolically in normally closed condition while at the same time establishing the open conditions with respect to the circulating fluid path for the pump 10. As shown, the normally closed outlet valve $O_r$ is connected within the conduit 15 between the cylinder chamber 9 and the check valve 16 and an additional conduit 17′ containing the check valve 18′ leads from the closed circulating fluid path to the main pressure line 4. Since the individual wheels are controlled independently of each other, the two outlet valves $O_l$ and $O_r$ do not necessarily operate together. With both valves in the normally closed positions as shown in FIG. 2, the fluid in the closed circulating path is free to circulate in the same fashion as was described in conjunction with FIG. 2. If, however, the left wheel outlet valve is disposed from its normally closed position to its normally open position as is schematically illustrated in FIGS. 3a–3d whereas the outlet valve $O_r$ remains in its normally closed condition, it will be appreciated that movement of the pistons 13 and 14 to the right in FIG. 2 will allow fluid to be bled from the left wheel cylinder through the conduit 7 and past the check valve 8 into the cylinder chamber 9 while, at the same time, the fluid expelled from the cylinder chamber 12 will flow through the check valve 18 and the conduit 17 back to the main pressure line 4. When the pistons 13 and 14 move to the left in FIG. 2, fluid will be transferred from the cylinder chamber 9 through the conduit 15 and the outlet valve $O_r$ and past the check valve 16 to the cylinder chamber 12. The operation will be similar with the conditions of the valves $O_l$ and $O_r$ reversed.

FIGS. 4a–4d show the two outlet valves in their open positions in which case it will be appreciated, from FIG. 2, that as the pistons 13 and 14 move to the left, fluid will be expelled from the chamber 9 past the check valve 18′ back to the main pressure line 4 whereas when the pistons move to the right, fluid will be expelled from the chamber 12 past the check valve 18 back to the main pressure line 4. In both cases, of course, the chambers 9 and 12 are filled from their respective wheel cylinder circuits $6_l$ and $6_r$ past the respective check valves 8 and 16.

It will be understood that the above description of the present invention is susceptible to various modifications, changes and adaptations.

I claim:

1. An anti-locking control system for vehicle brakes having a master cylinder, a wheel braking cylinder, a normally open inlet valve connecting said master cylinder to said wheel braking cylinder, a normally closed outlet valve for reducing the pressure is said wheel braking cylinder, and sensor means responsive to rotational acceleration and deceleration of the vehicle wheel for actuating said valves to control the pressure in said wheel braking cylinder predetermined fashion, the improvement comprising, in combination:
   a double acting piston and cylinder assembly having a pair of fluid chambers;

drive means for driving said assembly alternately to expel fluid from one chamber while inducting fluid into the other chamber and vice versa;

first conduit means connecting said chambers, said first conduit means including a first conduit connected to one chamber and a second conduit connected to the other chamber, both of said conduits being connected together when said outlet valve is closed and said first conduit being connected to said wheel braking cylinder when said outlet valve is open while said second conduit is blocked, and a first check valve in said first conduit permitting fluid to be inducted therethrough into said one chamber;

second conduit means connecting said chambers and including a second check valve permitting fluid to be expelled from said one chamber into said other chamber; and third conduit means connecting said other chamber to said master cylinder and including a third check valve permitting fluid to be expelled from said other chamber to said master cylinder when said outlet valve is open.

2. The anti-locking control system according to claim 1 including means for actuating said drive means only when said inlet valve is closed.

3. The anti-locking control system according to claim 1 including a brake light switch, said drive means being connected for actuation only when said brake light switch is closed.

4. The anti-locking control system as defined in claim 1 including a second wheel braking cylinder, a second normally open inlet valve connecting said master cylinder to said wheel braking cylinder, a second normally closed outlet valve for reducing the pressure in said second wheel braking cylinder, and sensor means responsive to rotational acceleration and deceleration of the wheel associated with said second wheel braking cylinder to control the pressure in said second wheel braking cylinder, said second conduit means including a third conduit connected to said one chamber, a fourth conduit connected to said other chamber, and including said second check valve, said third and fourth conduits being connected together when said second outlet valve is closed and said third conduit being connected to said second wheel braking cylinder when said second outlet valve is open while said fourth conduit is blocked, and fourth conduit means connecting said one chamber to said master cylinder and including a fifth check valve permitting fluid to be expelled from said one chamber to said master cylinder when said second outlet valve is open.

5. The anti-locking control system according to claim 4 including means for actuating said drive means only when an inlet valve is open.

6. The anti-locking control system according to claim 4 including a brake light switch, said drive means being connected for actuation only when said brake light switch is closed.

7. An anti-locking control system for vehicle brakes having a master cylinder, a wheel braking cylinder, a normally open inlet valve connecting said master cylinder to said wheel braking cylinder, a normally closed outlet valve for reducing the pressure in said wheel braking cylinder, and sensor means responsive to rotational acceleration and deceleration of the vehicle wheel for actuating said valves to control the pressure in said wheel braking cylinder in predetermined fashion, the improvement comprising, in combination:

double acting pump means having a pair of fluid chambers;

drive means for driving said assembly alternately to expel fluid from one chamber while inducting fluid into the other chamber and vice versa;

conduit means for circulating fluid unidirectionally between said chambers when said outlet valve is closed and including means for transferring fluid from said wheel cylinder to one chamber, then to the other chamber and then to said master cylinder when said outlet valve is open; and means for actuating said drive means when said master cylinder is actuated.

References Cited
UNITED STATES PATENTS

| | | | |
|---|---|---|---|
| 3,276,822 | 10/1966 | Lister et al. | 303—21UX |
| 3,401,987 | 9/1968 | Horvath | 303—21 |
| 3,494,670 | 2/1970 | Leiber | 303—21 |
| 3,498,683 | 3/1970 | Leiber | 303—21 |

MILTON BUCHLER, Primary Examiner

J. J. McLAUGHLIN, Jr., Assistant Examiner

U.S. Cl. X.R.

188—181; 303—63, 68